Aug. 14, 1928.  
C. CERQUA  
1,680,498

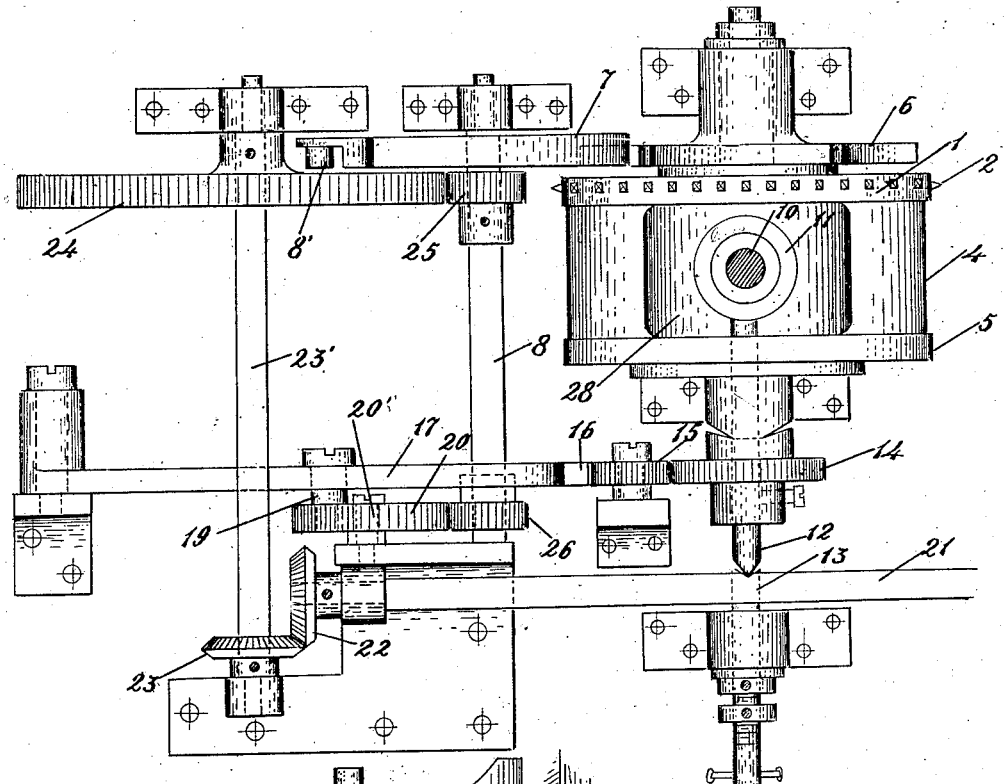
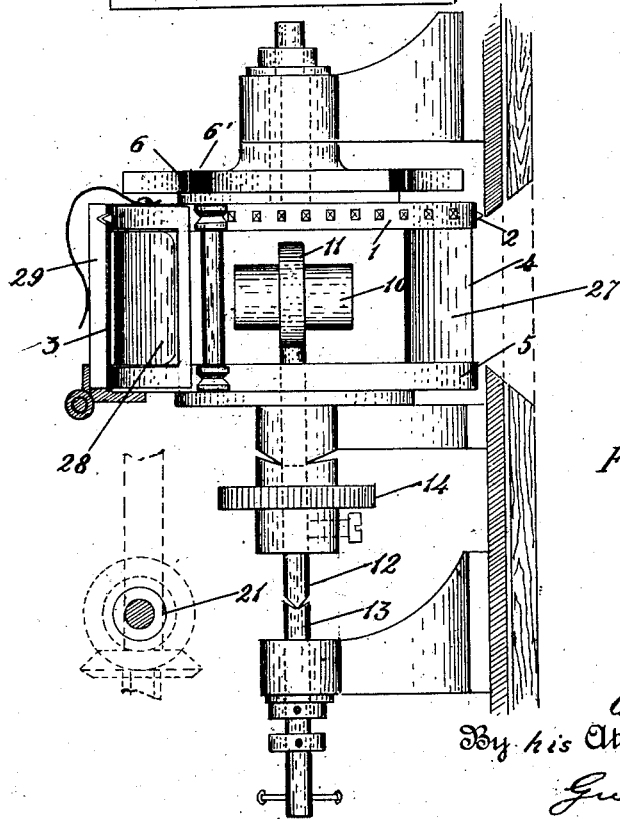
Fig. 1
Fig. 2
Inventor
Corrado Cerqua
By his Attorney

PANORAMIC MOVING PICTURE APPARATUS

Filed July 18, 1924   2 Sheets-Sheet 2

Inventor  
Corrado Cerqua  
By his Attorney

Patented Aug. 14, 1928.

1,680,498

UNITED STATES PATENT OFFICE.

CORRADO CERQUA, OF BROOKLYN, NEW YORK, ASSIGNOR TO FILOTEO ALBERINI, OF NEW YORK, N. Y.

PANORAMIC-MOVING-PICTURE APPARATUS.

Application filed July 18, 1924. Serial No. 726,812.

This invention relates to methods of, and apparatus for taking panoramic moving pictures, and its primary object is to provide a novel method of feeding the film through a suitable moving picture apparatus, permitting the production of panoramic pictures, that is, of pictures the angular width of which is above the normal, without increasing the width of the standard film.

Another object of this invention is to provide, in a panoramic moving picture apparatus, a novel and improved arrangement of objective and controlling means therefor, whereby a comparatively long exposure of the film may be obtained, in taking each photogram.

A still further object is to provide a novel and improved moving picture apparatus, whereby it is possible to take pictures of an angular width above the normal, without increasing the standard width of the film.

Other objects and advantages of the present invention will more fully appear as the description proceeds, and will be particularly pointed out and claimed in the appended claims.

Moving pictures are ordinarily taken by intermittently feeding a film in a substantially vertical direction, in front of a stationary objective or lens, and by operating a shutter at the periods when the film is stationary.

The result is a continuous series of photograms each arranged transversely to the length of the film, taken at the ordinary angular width of forty-five degrees. Other conditions being equal, therefore, if panoramic pictures are desired, by this being meant pictures the angular width of which is considerably above normal, it is necessary to increase the width of the film. Furthermore, while the film is held flat across the objective when ordinary pictures are taken, panoramic pictures imply the use of an objective capable of angular motion, and this necessitates a curved arrangement of the film, concentric to the pivotal support of the said objective, or practically so. This prevents distortion of the pictures, by producing a surface of impression at all times normal to the objective, and furthermore insures true proportion between the different parts of the picture, by causing all the points of the surface of impression to remain at practically the same distance from the objective.

However, it is obvious that if the pictures are taken transversely to the direction of feeding, this being the result of the objective being angularly movable in a plane at right angle to the direction of feeding, the film must be curved in the sense of its width, which corresponds to the length of each photogram. In fact, I know that apparatus have been built on this very principle, employing a film of suitable width, passing through a curved gage forcing the film to conform to the surface of an axially rotatable cylinder, within which the objective is mounted.

The film is naturally flat, being in the form of a ribbon, and the feeding means therefor comprise cylindrical surfaces, such as the surfaces of pulleys or other suitable elements; therefore the curving of its surface at the exposed point, creates a certain amount of friction which might react unfavorably on the operation of the machine generally, and which is also liable to cause scratches or other marks to appear on the sensitized surface.

The main practical objection to this arrangement, is the necessity of using films of other than standard width. Moving picture machines using a standard width of film practically all over the world, it is obvious that standard films can be produced at a much lower figure than films having a special width; therefore, economical considerations in this respect have considerable weight.

Another objection, as stated, is the creation of frictional resistance to the movement of the film, due to the necessity of subjecting it to a transverse bend, which may be harmful both to the smooth operation of the machine, and to the film itself.

Another objection resides in the complications of design which result from the necessity of producing the transverse bend in the film.

The present invention entirely eliminates these objectionable features, and not only does it provide a method and means whereby panoramic moving pictures may be obtained by using a film of the standard width, or of any width desired, but it also permits the taking of pictures of a greater angular width than would be possible by the methods heretofore in use.

Apparatus of this character such as are known to me, furthermore, include an objective which makes an entire revolution on its pivotal support, each time a photogram is taken. Only an angular portion of each revolution, such as delimited by the angular width of an opening through which the film is exposed, is actually used for creating the impression on the film; the rest of the revolution is only used to return the objective to its original position, and this idle period of travel requires the employment of means for occulting the lens during a certain portion of it. This arrangement therefore entails certain complications of design that it would be best to avoid; but, what is more important, it also means that given a certain speed of operation corresponding to a given number of pictures per minute, the length of exposure of the film for each photogram, representing, as it does, only a fraction of the total movement of the objective, is much shorter than if the time required for a complete revolution of the objective, were devoted entirely to the period of exposure.

One of the features of the apparatus forming one of the objects of the present invention, is an arrangement causing an angular motion of the objective, limited to the necessary angular width, taking place at the time of exposure of the film, in alternate directions; the objective moving in one direction when taking a photogram, and moving in the opposite direction when taking the next photogram; the maximum time of exposure is thus assured, as consistent with a given speed of operation.

In the annexed drawings I illustrate an embodiment of my invention, and in the same:

Fig. 1 is a rear view in elevation of an apparatus whereby my invention may be carried into practice;

Fig. 2 is a side view in elevation of the same, partly sectioned;

Figure 3:
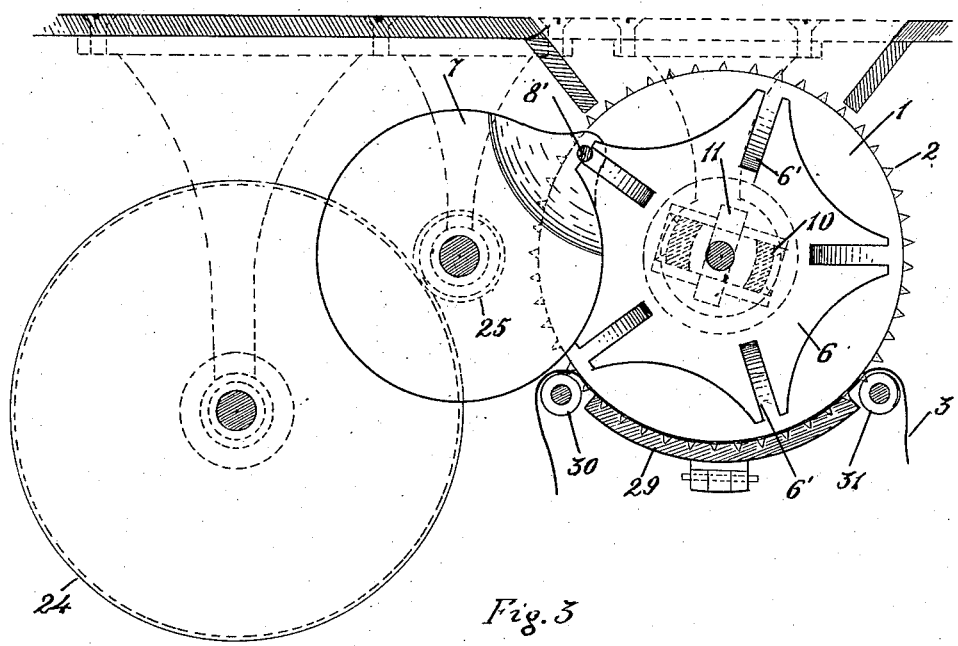
Fig. 3 is a plan view of the upper part of the mechanism.

The apparatus comprises intermittent feeding means for the film, including a pin wheel 1, rotatable on a vertical axis, and having pins or teeth 2 adapted to engage one of the rows of lateral perforations in the film 3. Angular movement of said wheel, causes feeding of the film in a horizontal direction. Under said wheel, is mounted a cylinder 4 coaxial therewith, with its base formed into a flat rim 5, slightly projecting from the cylindrical surface, and having a diameter equal to the diameter of wheel 1, forming therefore a bearing surface against which the lower side of the film abuts, as shown in Fig. 2. Cylinder 4 is stationary, while intermittent angular motion of the pin wheel is obtained by means of a Geneva motion comprising a radially slotted wheel 6, having five slots 6', integral with or attached to wheel 1, and a driving wheel 7, mounted on a vertical shaft 8, and provided with a pin 8' adapted to engage the slots. The operation of this type of gearing being well known, it is obvious that each revolution of wheel 7 will cause one-fifth of a revolution of wheels 6 and 1, and that while rotation of wheel 7 is continuous, the rotation of wheels 6, 1, is intermittent, and takes place at uniform intervals.

Within said cylinder, at right angle to the axis thereof, is mounted an objective 10, which is supported by an annular support 11, carried by a vertical shaft 12, coaxial with the cylinder, and rotatably mounted in relation thereto. On said shaft is mounted a gear wheel 14, in mesh with a pinion 15, which is driven by a geared segment 16, carried by an arm 17 pivoted at 9, in the manner which I will later describe.

Arm 17 is provided with a radial slot 18, within which projects a pin 19 fixed on the face of a gear wheel 20, mounted on a vertical stud 20'.

Figure 4:
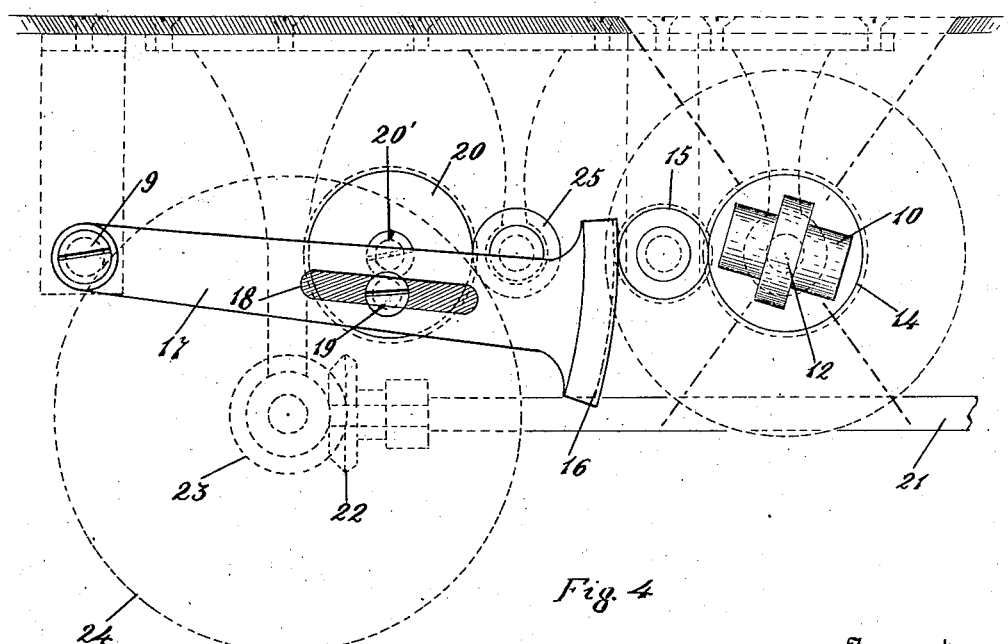
Fig. 4 is a plan view of the lower part of said mechanism.

21 designates the main shaft, which is provided with a conical gear wheel 22, in mesh with another conical gear wheel 23 mounted on a vertical shaft 23'. Said shaft 23' carries a spur gear wheel 24, which drives a pinion 25 mounted on shaft 8. Said shaft 8, furthermore, carries a pinion 26 in mesh with gear wheel 20. Rotation of shaft 21, therefore is transmitted to gear wheel 20 by means of gear wheels and pinions 22, 23, 24, 25, 26; but the connection by slot 18 and pin 19, will cause continuous rotation of wheel 20 to be transformed into reciprocating angular motion of arm 17. In Fig. 4, arm 17 is shown at the extreme of its clockwise motion; it is obvious that one-half revolution of wheel 20 from the position shown, will cause the arm to move in a counter-clockwise direction, to its other extreme position. These various parts are so proportioned, that one half revolution of gear wheel 20 will cause, through geared segment 16, pinion 15, and gear wheel 14, motion of the objective 10 in one direction, of the proper angular width, in this case about ninety degrees; and the other half revolution will cause angular motion of the objective in the opposite direction, and of the same angular width.

The cylinder 4 is formed with two diametrically opposite openings 27, 28. The front opening 27 has a suitable angular width, to permit the passage of the light rays reaching objective 10 during its travel; and the rear opening 28, delimits the space allotted on the film for each photogram, obviously corresponding to the unit of travel in the intermittent motion of the film.

The film is maintained close to the surface of the cylinder, in correspondence of opening 28, by a pressure or guiding block 29, and by two idle rollers 30, 31; the film is thus caused to assume the curvature of the surface of the cylinder, longitudinally to the film, and this bend is thus naturally and easily assumed during the longitudinal travel of the film, without any noticeable friction.

The diameters of pinion 25 and gear wheel 20 are in the proportion of 1:2, so that one revolution of wheel 7 corresponds to one-half revolution of wheel 20, or to one angular motion of the objective. If the operation of shaft 21 is started from the position shown in Figs. 3, 4, so as to rotate wheel 7 in a clockwise direction, the same will first cause a one-fifth rotation of wheels 6, 1, feeding the film a corresponding amount. After a certain relatively limited angular motion of wheel 7, its pin 8' becomes disengaged from the slot in wheel 6, and while wheel 7 continues its rotation, wheels 6, 1, will remain stationary.

During the initial period of motion, a certain angular motion of wheel 20 has also taken place, but in this position the corresponding angular motion of arm 17 is very small, the motion of arm 17 being a harmonic motion. The major part of the angular travel of the objective will therefore take place while the film is stationary.

A suitable shutter mechanism, not shown, may obviously be provided, intercepting the light to the objective during the period of motion of the film, and allowing the light to pass while the film is stationary; the control of the shutter mechanism being merely a question of proper timing, its intermittent operation having the same frequency as the film feed.

The film produced, is a continuous series of photograms arranged lengthwise to the film, and therefore the film will have to be fed horizontally for projection purposes. It is obvious, that the angular width of each photogram is absolutely independent of the width of the film, and therefore the main object of this invention, is accomplished as a matter of course.

It is also plain, that the bending of the film to conform to the surface of the cylinder, will be effected much more easily than if a cross bend had to be obtained, such as required by photograms arranged crosswise to the film.

It will be observed, however, that while curving of the film surface is desirable, in order to obtain pictures of the right proportions, and free from distortions, sufficiently good results may be obtained even if the curvature of the sensitized surface is not concentric to the movement of the objective; and when the angular width of the pictures, although more than the normal, is relatively limited, even a straight surface for the film will answer for ordinary purposes.

It will also be observed, that while I prefer to use a limited angular motion of the objective, in order to improve the conditions of exposure, or to increase the speed of operation, or both, my method may also be carried into practice by using only a portion of a full rotation of the objective, for creating an impression on the sensitized surface; because, as stated, the main feature of my invention is the taking of the pictures lengthwise to the film, by having the objective movable in the same plane with the film, quite independently of the mechanism by means of which either the film or the objective are operated.

While the drawings represent one of the preferred embodiments of my invention, the same are to be considered as intended for illustrative purposes only, and not in a limiting sense; since it is obvious that most mechanical appliances lend themselves to a number of changes and alternative forms, which do not necessarily entail changes in the inventive idea.

Therefore I intend to protect my invention as broadly as the prior art will permit, and I reserve myself the right to carry it into practice in any way or manner which may enter, fairly, into the scope of the appended claims.

I claim:

1. In a panoramic camera, the combination, with a casing and an angularly movable objective mounted in said casing, of a film, a feeding member therefor interlocking therewith coaxial with the axis of rotation of said objective, means adapted to cause intermittent partial rotation of said feeding member in one direction, means associated therewith adapted to alternately cause swinging motion of said objective from one extreme of its angular travel to the other, and an operating member controlling the operation of said feeding member and swinging means.

2. In a panoramic camera, the combination, with a casing and an angularly movable objective mounted in said casing, of a film, means adapted to feed said film in front of said objective in a direction normal to the axis of rotation of said objective, an intermittent gearing controlling the operation of said feeding means, a reciprocating member controlling the operation of said objective, and a continuously operable member operating said gearing and reciprocating member.

3. In a panoramic camera, the combination, with a casing and an angularly movable objective mounted in said casing, of a film, a feeding member therefor coaxial with the axis of rotation of said objective, a Geneva gearing controlling the operation of said feeding member, a reciprocating member controlling the operation of said objective, and a member operating said gearing and reciprocating member.

4. In a moving picture camera, the combination, with a casing and an angularly movable objective mounted in said casing, of a film, a feeding member therefor interlocking therewith coaxial with the axis of rotation of said objective, means causing intermittent angular motion of said feeding member in one direction, means associated therewith causing alternate swinging motion of said objective from one extreme of its angular travel to the other, and continuously operable means causing continuous alternate operation of said feeding and swinging means.

5. In a moving picture camera, the combination, with a casing and an angularly movable objective mounted in said casing, of a film, a feeding member therefore interlocking therewith coaxial with the axis of rotation of said objective, means adapted to intermittently cause partial rotation of said feeding member in one direction, means adapted to cause alternate swinging motion of said objective from one extreme of its angular travel to the other, and continuously operable operating means causing alternate operation of said feeding and swinging means, said operating means causing said feeding member to remain stationary at the time when said objective swings from one extreme position to the other.

6. In a moving picture camera, the combination, with a casing and an angularly movable objective mounted in said casing, of a film, a feeding member therefor interlocking therewith coaxial with the axis of rotation of said objective, a Geneva gearing controlling the operation of said feeding member, a reciprocating member associated therewith controlling the operation of said objective, and means causing continuous alternate operation of said gearing and reciprocating member.

7. In a moving picture camera, the combination, with a casing and an angularly movable objective mounted in said casing, of a film, a feeding member therefor coaxial with the axis of rotation of said objective, a Geneva gearing controlling the operation of said feeding member, a reciprocating member controlling the operation of said objective, means causing alternate operation of said gearing and reciprocating member in continuous succession, and means limiting the field of operation of said objective to that portion of its angular travel, which corresponds to periods of rest of said feeding member.

8. In a moving picture camera, the combination, with a casing and an angularly movable objective mounted in said casing, of a film, means adapted to cause intermittent feeding motion of said film in front of said objective in a direction normal to the axis of rotation of said objective, positive driving means associated therewith adapted to cause swinging motion of said objective in one and then in the other direction, and continuously operable means causing alternate operation of said feeding and driving means in continuous succession.

9. In a moving picture camera, the combination, with a casing and an angularly movable objective mounted in said casing, of a film, feeding means therefor, an operating member adapted for continuous operation, means associated therewith, causing intermittent operation of said film feeding means and means also associated therewith, causing alternate motion of said objective from one extreme to the other of its angular travel, said film feeding means being operative when said objective is held virtually stationary at one of its extreme positions.

10. In a device of the class described, the combination with a casing, an angularly movable objective and a film of a circular rotatable feeding member coaxial with said objective engaging said film; and means for producing rotary movement of said feeding member, causing the portion of said film engaged thereby to follow the angular displacement of said feeding member, and to assume the curvature of the surface thereof.

11. In a moving picture camera, the combination with a casing and an angularly movable objective mounted in said casing, of a film, a rotatable operating member adapted for continuous rotation, means associated therewith causing intermittent feeding of said film in one direction and means also associated with said operating member causing alternate swinging motion of said objective from one extreme to the other of its angular travel, said swinging motion occurring during the intervals when said film feeding means are stationary.

12. In a moving picture camera, the combination with a casing, an angularly movable objective mounted in said casing, a film, and means for intermittently feeding said film, transversely to the axis of rotation of said objective, of actuating means associated with said objective adapted to cause the angular motion thereof, and means operatively associated with said feeding means, positively driving and timing the operation of said actuating means.

13. In a moving picture camera, the combination, with a casing, an angularly movable objective mounted in said casing, a film, and means for intermittently feeding said film, of actuating means associated with said objective, adapted to cause alternate swinging motion of said objective from one extreme to the other of its angular travel, and means operatively associated with said feeding means, positively driving said actuating means, timing said swinging motion to coincide with the periods of rest of said film.

14. In a moving picture camera, the combination, with a casing, an angularly movable objective mounted in said casing, a film, and means for intermittently feeding said film, of actuating means associated with said objective adapted to cause the angular motion thereof, a driving member rotating in one direction, and a reciprocating member operatively associated with said driving member, establishing a positive driving connection between said driving member and said actuating means.

15. In a panoramic camera, the combination, with a casing, an angularly movable objective mounted in said casing, operating means therefor, and a film, of means for deflecting said film causing the portion thereof exposed to the action of said objective to follow an outline substantially concentric to the axis of rotation of said objective, said deflecting means being rotatably mounted and adapted to move simultaneously with said film.

16. In a panoramic camera, the combination, with a casing, an angularly movable objective mounted in said casing, operating means therefor, and a film, of a rotatable feeding member coaxial with the axis of rotation of said objective engaging said film, causing it to assume the curvature of its surface, and means for causing partial rotation of said feeding member.

17. In a moving picture camera the combination, with a casing, an angularly movable objective mounted in said casing, operating means therefor, and a film, of a rotatable feeding member coaxial with the axis of rotation of said objective engaging said film causing it to assume the curvature of its surface, and means for causing intermittent partial rotation of said feeding member timed to the operation of said objective.

18. In a moving picture camera, the combination, with a casing and an angularly movable objective mounted in said casing, of a film, means for intermittently swinging said objective from one extreme to the other of its angular travel, rotatable operating means therefor, means for transforming continuous rotation of said operating means into reciprocating motion of said swinging means, and means also operatively associated with said operating means for intermittently feeding said film in front of said objective in a direction normal to the axis of rotation of said objective, said objective sweeping the exposed portion of said film while said film is held stationary for an exposure.

19. In a moving picture camera, the combination, with a casing and an angularly movable objective mounted in said casing, of a film, means for intermittently swinging said objective from one extreme to the other of its angular travel, rotatable operating means therefor, means for transforming continuous rotation of said operating means into reciprocating motion of said swinging means, means also operatively associated with said operating means for intermittently feeding said film in front of said objective in a direction normal to the axis of rotation of said objective, said objective sweeping the exposed portion of said film while said film is held stationary for an exposure, and means causing said film to assume a curvature concentric or substantially concentric to said axis, at its point of exposure.

20. In a panoramic camera, the combination with a casing and an angularly movable objective mounted in said casing, of a film, continuously operable controlling means therefor, means associated therewith intermittently causing in continuous succession feeding of said film in front of said objective in a direction normal to the axis of rotation of said objective, means also associated therewith causing swinging motion of said objective from one extreme to the other of its angular travel, said last mentioned means remaining virtually stationary while the film is being fed and said film feeding means remaining stationary while said objective swings from one extreme to the other.

21. In a panoramic camera, the combination, with a casing and an angularly movable objective mounted in said casing, of a film, continuously operable controlling means therefor, means associated therewith, intermittently causing in continuous succession feeding of said film in front of said objective in a direction normal to the axis of rotation of said objective, and swinging motion of said objective from one extreme to the other of its angular travel, said film feeding means remaining stationary while said objective swings from one extreme position to the other.

22. In a panoramic camera, the combination, with a casing and an angularly movable objective pivotally mounted in said casing, of a film, a feeding member therefor interlocking therewith coaxial with the axis of rotation of said objective, means causing angular motion of said feeding member about its axis, and means associated therewith causing swinging motion of said objective from one extreme of its angular travel to the other.

23. In a moving picture camera, the combination, with a casing and an angularly movable objective pivotally mounted in said casing, of a film, means for feeding said film in front of said objective in a direction normal to the axis of rotation of said objective, means causing swinging motion of said objective from one extreme of its angular travel to the other, continuously operable controlling means therefor, and means operatively associated with said controlling means, for causing continuous alternate operation of said feeding and swinging means, said operatively associated means causing said film to remain stationary at the time when said objective swings from one extreme position to the other.

24. In a panoramic camera, the combination, with a casing, an angularly movable objective mounted in said casing, a film, means for feeding said film transversely to the axis of rotation of said objective, and operating means therefor, of actuating means associated with said objective causing the angular motion thereof, and a geared driving connection between said objective and said actuating means.

CORRADO CERQUA.